US008698803B2

(12) United States Patent
Patel et al.

(10) Patent No.: US 8,698,803 B2
(45) Date of Patent: Apr. 15, 2014

(54) EFFICIENT GEOMETRIC TESSELLATION AND DISPLACEMENT

(75) Inventors: Amar Patel, Kirkland, WA (US); Peter-Pike J. Sloan, Bellevue, WA (US); Craig C. Peeper, Kirkland, WA (US); Samuel Z. Glassenberg, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/039,884

(22) Filed: Mar. 3, 2011

(65) Prior Publication Data

US 2011/0148877 A1    Jun. 23, 2011

Related U.S. Application Data

(62) Division of application No. 12/024,754, filed on Feb. 1, 2008, now Pat. No. 7,928,979.

(51) Int. Cl.
*G06T 17/20* (2006.01)
(52) U.S. Cl.
USPC ............................ 345/423; 345/419; 345/420
(58) Field of Classification Search
USPC .................................. 345/423, 601, 419, 420
See application file for complete search history.

(56) References Cited

U.S. PATENT DOCUMENTS

| | | | | |
|---|---|---|---|---|
| 6,057,848 A * | 5/2000 | Goel | ............................. | 345/423 |
| 6,784,894 B2 * | 8/2004 | Schimpf et al. | ............... | 345/581 |
| 2003/0148802 A1 * | 8/2003 | Takahama et al. | ................ | 463/1 |
| 2004/0012563 A1 * | 1/2004 | Papakipos et al. | ............ | 345/157 |
| 2004/0085313 A1 * | 5/2004 | Moreton et al. | ............... | 345/423 |
| 2006/0197760 A1 * | 9/2006 | Yamada | ........................ | 345/423 |

OTHER PUBLICATIONS

Jatin Chhugani and Subodh Kumar, "View-dependent adaptive tessellation of spline surfaces", Proceedings of the 2001 symposium on Interactive 3D graphics (I3D '01), 2001, ACM, New York, NY, USA, pp. 59-62.*
MarcOlano et al., "Procedural Primitives in a High Performance, Hardware accelerated, Z-buffer Rendere", 1997, Department of Computer Science University of North Carolina.*
Marc Olano et al., "Procedural Primitives in a High Performance, Hardware accelerated, Z-buffer Rendere", 1997, Department of Computer Science University of North Carolina.*

(Continued)

*Primary Examiner* — Kimbinh T Nguyen
(74) *Attorney, Agent, or Firm* — Aaron Chatterjee; Peter Taylor; Mickey Minhas

(57) ABSTRACT

Methods and computer-storage media are provided for rendering three-dimensional (3D) graphics by tessellating objects using novel structures and algorithms. Rendering utilizing "patches," configurable functions that include a specified number of control points, allows for computation on a per-patch or per-control-point basis, in addition to traditional per-vertex, per-primitive, and per-pixel methods. This produces a number of advantages over previous tessellation methods, including the reuse of computations across existing vertices and the ability to process at a lower frequency. The operations to compute points are simplified in order to optimize system resources used in the process. Transitions from un-tessellated to tessellated objects are smoother utilizing the present invention, while developers have more flexibility in the level of detail present at different edges of the same patch. Detail within a displacement map also can be increased without negative effects associated with previous systems and methods.

12 Claims, 17 Drawing Sheets

(56) References Cited

OTHER PUBLICATIONS

Jatin Chhugani and Subodh Kumar, "View-dependent adaptive tessellation of spline surfaces", Proceedings of the 2001 symposium on Interactive 3D graphics (I3D '01), 2001, ACM, New York, NY, USA, pp. 59-62.*

Adarsh Krishnamurthy, Rahul Khardekar, and Sara McMains. 2007. Direct evaluation of NURBS curves and surfaces on the GPU. In Proceedings of the 2007 ACM symposium on Solid and physical modeling (SPM '07). ACM, New York, NY, USA, 329334.*

* cited by examiner

EFFICIENT GEOMETRIC TESSELLATION AND DISPLACEMENT

CROSS-REFERENCE TO RELATED APPLICATIONS

This application is a divisional of and claims priority from nonprovisional application Ser. No. 12/024,754, filed Feb. 1, 2008, and entitled "Efficient Geometric Tessellation and Displacement," and is incorporated herein in its entirety.

BACKGROUND

When generating three-dimensional (3D) graphics in computing environments, developers must transform a surface from three dimensions into an interwoven mesh of two-dimensional shapes. The process, tessellation, usually relies on the use of triangles to depict objects. Triangles are fit in such a way as to depict virtually any other shape and also to add a perceived topology for the added three-dimensional effect. The generation of each mesh is characterized by several parameters, such as the number of triangles used, the size and proportion of those triangles, and the subsequent translation of triangles to pixels on screen. These parameters vary not only from object to object, but also when an object is viewed from more than one theoretical vantage point. The result of the added complexity created by multiple views is another set of considerations, such as the level of detail generated at any specific point on the object, to what degree the object's surfaces appear smooth, and the movement from one level of detail to another. Providing too little or too much detail creates problems in depicting these objects. The former can lead either to graphics that appear triangulated and unrealistic, while the latter generates too many calculations, i.e. too many data points, that add little definition to the object being rendered.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments of the present invention relate to in tessellating objects divided into "patches" so that three-dimensional graphics may be rendered. In one embodiment, smooth transition is provided from no tessellation to tessellation in a continuous manner. By rendering graphics using odd-fractional tessellation, points are inserted near selected control points and the movement from one figure to the next is not disjointed. The edges and interior portions of a patch may be tessellated in a variety of ways not previously available, while maintaining edges that do not have gaps between adjacent patches. The density of primitives throughout a tessellated patch may also be selected.

In another embodiment, objects may be defined not only in terms of primitives, vertices and pixels, but also as patches and control points. By utilizing tables of fixed-point values that are generated through less-resource-intensive methods, calculations are more efficient. Through the addition of extra frequencies by which the calculations may occur, optimal frequencies not available in the prior art can be utilized that reduce the computation required by hardware components. This provides more realistic rendering with less computational cost.

In other embodiments, applications of the rendering method can be exercised that avoid undesirable effects of prior art systems. Using tessellation values that are twice the value of previous values allows the placement of data points in the same locations from one rendering to the next. When further detail is introduced, the additional points are inserted among the previously rendered points in order to avoid a rippling appearance of the previously rendered object and to maintain a rigid appearance. Termed "geomorphing," the described embodiments of this application add flexibility by not requiring each edge of a patch to utilize the same tessellation factor.

BRIEF DESCRIPTION OF THE DRAWINGS

Embodiments are described in detail below with reference to the attached drawing figures, wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described. Figures below, particularly of exemplary screenshots, will use like numbers when possible in order to show similarities and differences from figure to figure.

Embodiments of the present invention include methods and computer-storage media with computer-usable instructions embodied thereon that, when executed, more efficiently calculate and load data points for rendering three-dimensional graphics. Embodiments render objects using one or more patches that have a specified number of control points. Rather than limit processing to previously available frequencies of primitives, vertices, or pixels, embodiments allow objects to be processed on a per-patch or per-control-point basis. Some embodiments use odd tessellation to smoothly transition between no tessellation and some tessellation. In certain embodiments, a table of reciprocal, multiplication-generated, and addition-generated fixed-point values can be used to avoid difficulties with approximations and to reduce computational costs. In other embodiments, tessellation is limited to power-of-two partitioning methods to avoid negative visual effects with inserting additional detail. In still other embodiments, points calculated for patches can be re-used for subsequent rendering.

Having briefly described an overview of embodiments of the present invention, an exemplary operating environment suitable for implementing embodiments hereof is described below.

Figure 1:
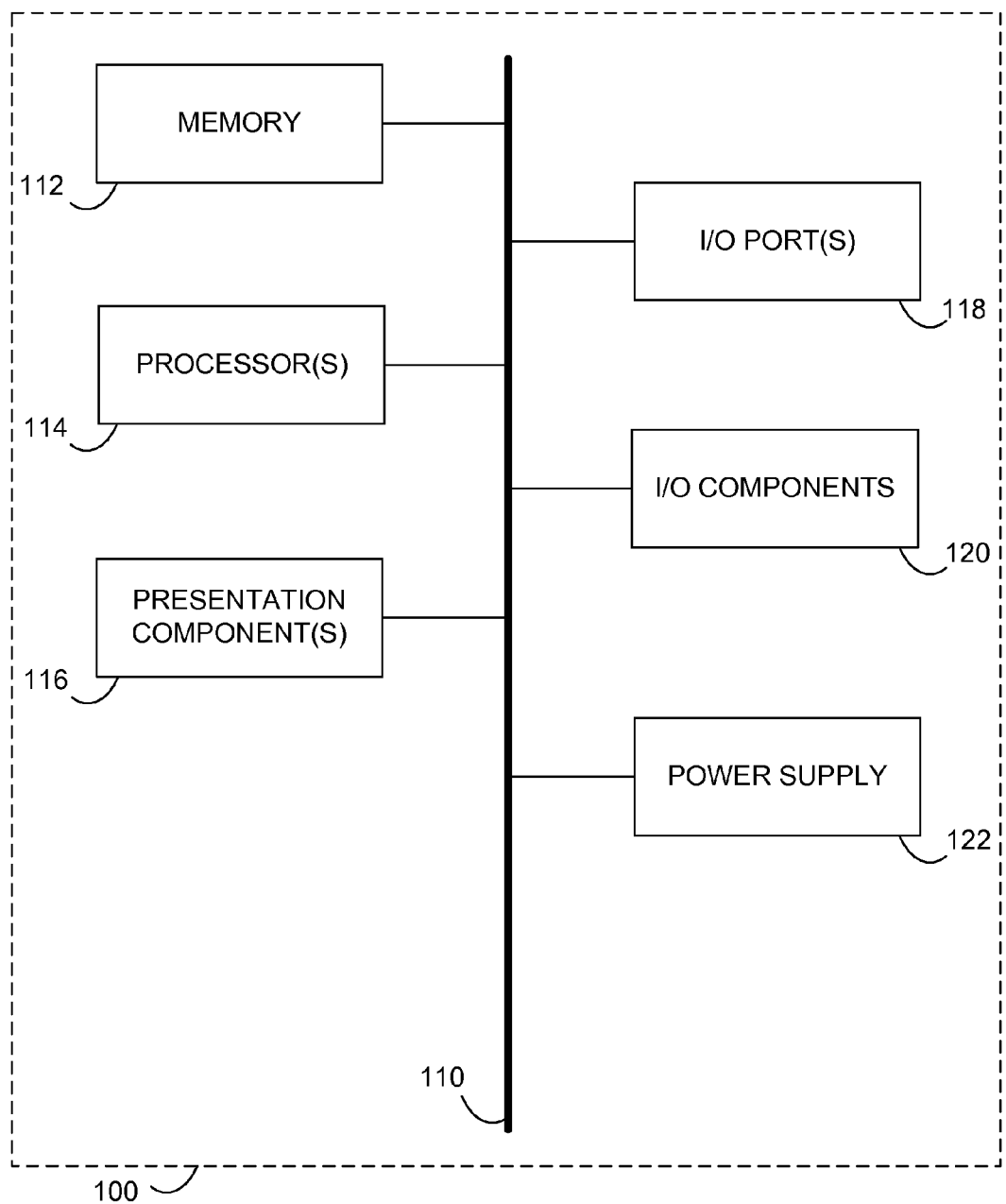
FIG. 1 is a block diagram of an exemplary computing environment suitable for use in implementing embodiments of the present invention.

Referring to the drawings in general, and initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing environment 100 be interpreted as having any dependency or requirement relating to any one or combination of modules/modules illustrated.

Embodiments may be described in the general context of computer code or machine-useable instructions, including computer-executable instructions such as program modules, being executed by a computer or other machine, such as a personal data assistant or other handheld device. Generally, program modules including routines, programs, objects, modules, data structures, and the like, refer to code that performs particular tasks, or implement particular abstract data types. Embodiments may be practiced in a variety of system configurations, including hand-held devices, consumer electronics, general-purpose computers, specialty computing devices, etc. Embodiments may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation modules 116, input/output (I/O) ports 118, I/O modules 120, and an illustrative power supply 122. Bus 110 represents what may be one or more busses (such as an address bus, data bus, or combination thereof). Although the various blocks of FIG. 1 are shown with lines for the sake of clarity, in reality, delineating various modules is not so clear, and metaphorically, the lines would more accurately be grey and fuzzy. For example, one may consider a presentation module such as a display device to be an I/O module. Also, processors have memory. The inventors hereof recognize that such is the nature of the art, and reiterate that the diagram of FIG. 1 is merely illustrative of an exemplary computing device that can be used in connection with one or more embodiments. Distinction is not made between such categories as "workstation," "server," "laptop," "hand-held device," etc., as all are contemplated within the scope of FIG. 1 and reference to "computer" or "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, carrier wave or any other medium that can be used to encode desired information and be accessed by computing device 100.

Memory 112 includes computer-storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O modules 120. Presentation module(s) 116 present data indications to a user or other device. Exemplary presentation modules include a display device, speaker, printing module, vibrating module, etc. I/O ports 118 allow computing device 100 to be logically coupled to other devices including I/O modules 120, some of which may be built in. Illustrative modules include a microphone, joystick, game pad, satellite dish, scanner, printer, wireless device, etc.

Turning now to FIG. 2A, a flowchart depicts a method of generating 3D graphics by tessellating objects according to an embodiment of the present invention. At the onset of the method, the geometry of a patch is determined at a step 200. A patch is a combination of primitives following a configurable function with a defined number of control points. As one example, a triangular patch may be used, using three control points corresponding to the vertices of the triangle. Another exemplary patch is a quad-domain patch that has four control points. When not tessellated, this is simply a rectangle formed by the back-to-back placement of two triangles. The four control points are the four corners of the rectangle and the two triangles are formed by connecting one pair of diagonal control points. While these two implementations are the most intuitive, more complex configurations using more control points and more elaborate calculations are possible. In one embodiment of the present invention, patches are defined by up to 32 control points and vary based on the higher order functions used to define them. This is not meant to be construed as a limitation however, as patches may be any definable geometry with any specified number of control points. The configurable functions used to further define the patches are typically higher order functions, such as bi-quadratic or bi-cubic functions and may be used to create a smooth surface for the rendered patch. Bezier patches or splines can be used to define such functions, generate the increased detail, displace portions of the patch and the like.

Once the patch function and control points are selected at step 200, parameters termed tessellation factors are selected at a step 210. Individual parameters and factors will be discussed in greater detail in conjunction with the other aspects of embodiments of the present invention. However, one attribute common to each of the various tessellation factors is that adjustment of a factor affects the number and shape of primitives into which a patch is divided. Embodiments of the present invention allow for selecting factors regarding the tessellation of patch edges and interiors, as well as the manner in which the patch is partitioned. The density of data points throughout a patch is also one of the factors that is selectable and affects patch geometry. These factors will be discussed in greater detail below as exemplary screenshots are provided for clarity in the description.

Once these factors are selected, two characteristics of the factors are checked to determine if and how a patch will be tessellated. At a step 220, tessellation factors are checked to see if any are greater than the minimum required by the selected partitioning method. A tessellation factor of one translates to one primitive per edge, therefore this is the patch shape itself. There may be more than one primitive, for example two triangles constituting a quad patch. Strictly speaking, however, this is not a tessellated patch. Thus, if none of the tessellation factors are greater than one, the patch can be rendered as is and the process moves to a step 240, where a check is made to see if tessellation factors subsequently have been modified. If a tessellation factor is greater than one, then the patch is divided into additional primitives according to the factor selected. Likewise, if an even-fractional partitioning method is selected, a minimum factor of two must be chosen in order to tessellate a patch. Integer and power-of-two tessellation, like odd tessellation, require a minimum factor of one.

If a tessellation factor is greater than one, the second characteristic of the tessellation factors that impact primitive geometry are checked at a step 230. If a tessellation factor and partitioning method match at 230, the segments used to divide the patch are equal in length as seen at step 232. If not, the primitives used to tessellate the object will be of differing proportions as shown at step 234. As mentioned previously, those using uniform lengths appear more realistic, as do graphics rendered with symmetric primitives. Again, methods of partitioning along with their novel features are discussed in further detail below.

Figure 2:
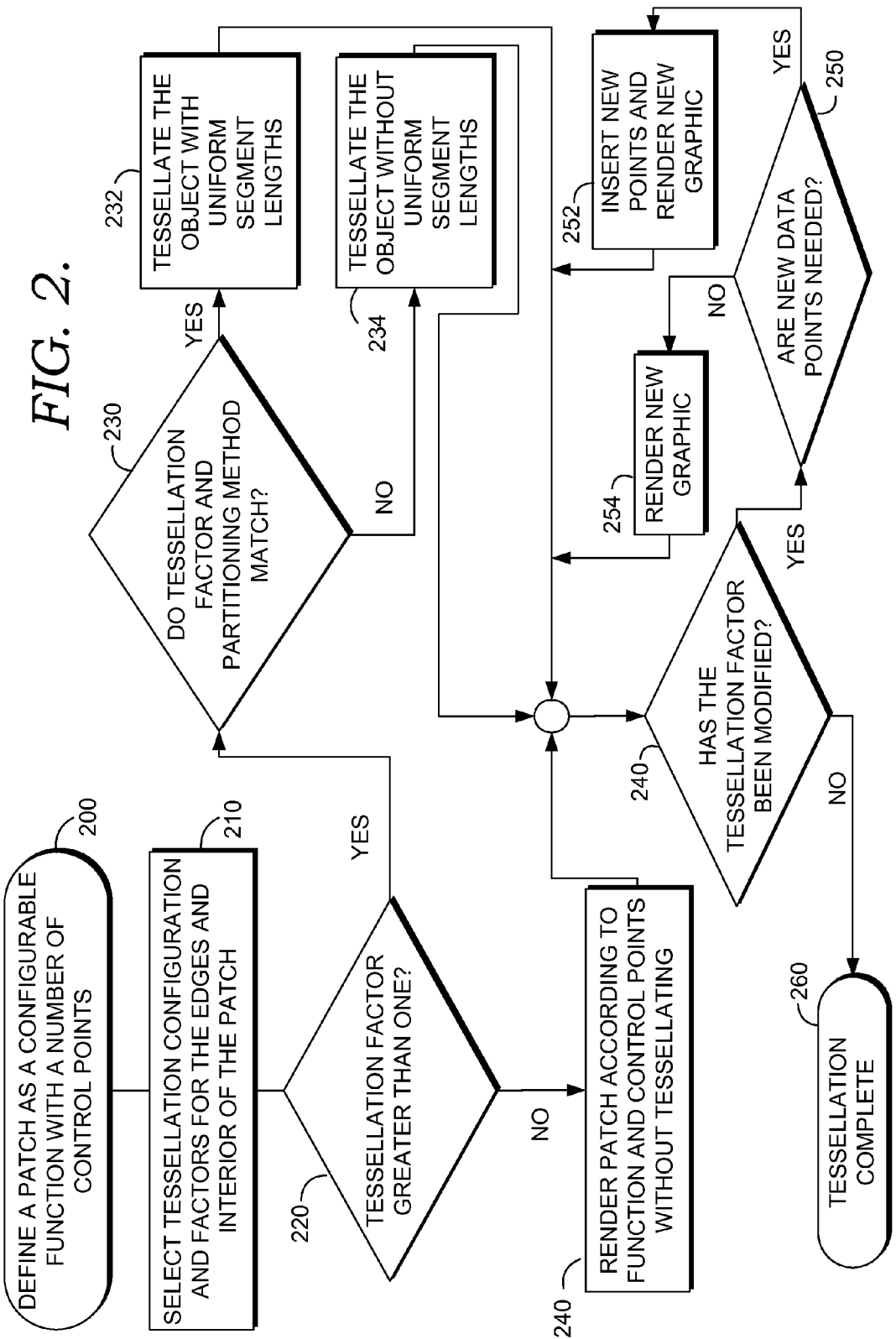
FIG. 2 is flowchart depicting a method of tessellating objects according to one embodiment of the present invention.

Continuing with FIG. 2, at a step 240, a determination is made whether to modify a tessellation factor, thereby modifying a patch. If a modification is made, a step 250 determines whether or not new data points must be inserted to alter the tessellation, that is, if the tessellation factor is increasing or not. If the factors are increasing, new points are inserted, edges are further divided, and the new primitives are rendered at a step 252. If new points are not required at step 250, the new primitives are simply rendered in their new configuration at a step 254. If a "reserved" value, such as zero or a value that is not a number is used, the patch can be removed or culled altogether. In all instances, once the modifications are complete, steps 252 or 254 return to step 240 to determine if another modification has taken place. The modification of tessellation factors can be an iterative process, whereby more modifications are made and more calculations must be completed to render a newly tessellated object. However, if the modifications are complete, then the tessellation ends at a step 260.

Selection of tessellation configuration and factors will now be discussed in more detail, which corresponds to step 210 of FIG. 2. One of the tessellation configuration parameters that may be selected is a partitioning method to be used with a patch. Examples of possible partitioning configurations are odd-fractional, even-fractional, power-of-two, and integer partitioning. These are not meant to limit the present invention, but are merely illustrative. Odd-fractional partitioning has several clear advantages over prior art systems and methods, one of which being that tessellation can occur from a factor of one. Using claimed embodiments of the present invention, objects can smoothly transition from no tessellation (i.e., tessellation factor of one), to some tessellation without sudden changes in the patch geometry, or "popping." Additional data points are inserted very near the control points, so that new primitives are created from new lines rendered near the edges. The tessellation process is therefore continuous. This is advantageous over even-tessellation methods, those tessellating from a factor of two, that create new lines and primitives near the center of a patch in a disjointed manner. As mentioned previously, odd tessellation creates uniform segment lengths when tessellation factors are odd. Using this partitioning method also creates symmetry around edges, which results in a more realistic image. Thus, more realistic images are rendered with a reduced hardware expenditure. The odd-tessellation aspect provides more efficient use of hardware when operating with triangular patches. In this instance, no extra processing is necessary for corner cases because the patch itself is triangular.

Other partitioning methods can be contrasted with odd tessellation. Even-fractional partitioning provides equal segment lengths when an even value is selected. This tessellation method also is shown in screenshots below. Even tessellation does not allow for smooth transitions from no tessellation to minimal tessellation, but does have advantages dependent on other geometries. Integer partitioning also follows its naming convention, only tessellating objects with uniform segments at discrete integer values and not at fractional values. The final method shown in the exemplary screenshots provided below is power-of-two tessellation. This also lacks continuity in generating patches, but provides novel features of a different sort. Power-of-two tessellation requires that graphics are tessellated and rendered with uniform segments only at values created by raising two to an integer power, e.g. 2, 4, 8, 16, etc. This is advantageous to one specific application that is described with regard to FIG. 6. Of note is the location of data points, which are generated in the same location for subsequent tessellations. As an example, all of the points generated when a patch has a tessellation factor of two are also in the same location for a tessellation factor of four. Thus, the improved detail is simply added in, rather than changing the placement of previously existing data points. Again, these examples are merely illustrative of certain embodiments and should not limit the scope of embodiments of the present invention.

Examples of tessellation factors that may be selected are edge tessellation factors of the patch and interior characteristics. In some embodiments of the present invention, three-edge triangular patches and four-edge quad patches are used with up to 32 control points. Again, this is meant to be illustrative and the tessellation factors are limited only by the number of edges present on a patch. Interior reduction may also be selected. Interior reduction refers to the method by which interior tessellation occurs for a patch that has different tessellation factors at its edges. There are several methods, including minimum, maximum and average reductions, that are potentially available. Embodiments of the present invention also provide an ability to expose various reduction methods to a user in order to customize the interior appearance of the patch to the greatest degree possible. The need for a particular reduction method may depend on the particular patch. This will be discussed in greater detail with respect to FIGS. 7A-7C below. A closely related factor that may be selected is the interior scaling factor. This parameter allows the density at which interior tessellation occurs to be selected and will be discussed with respect to FIGS. 8A-8B below.

Figure 3:
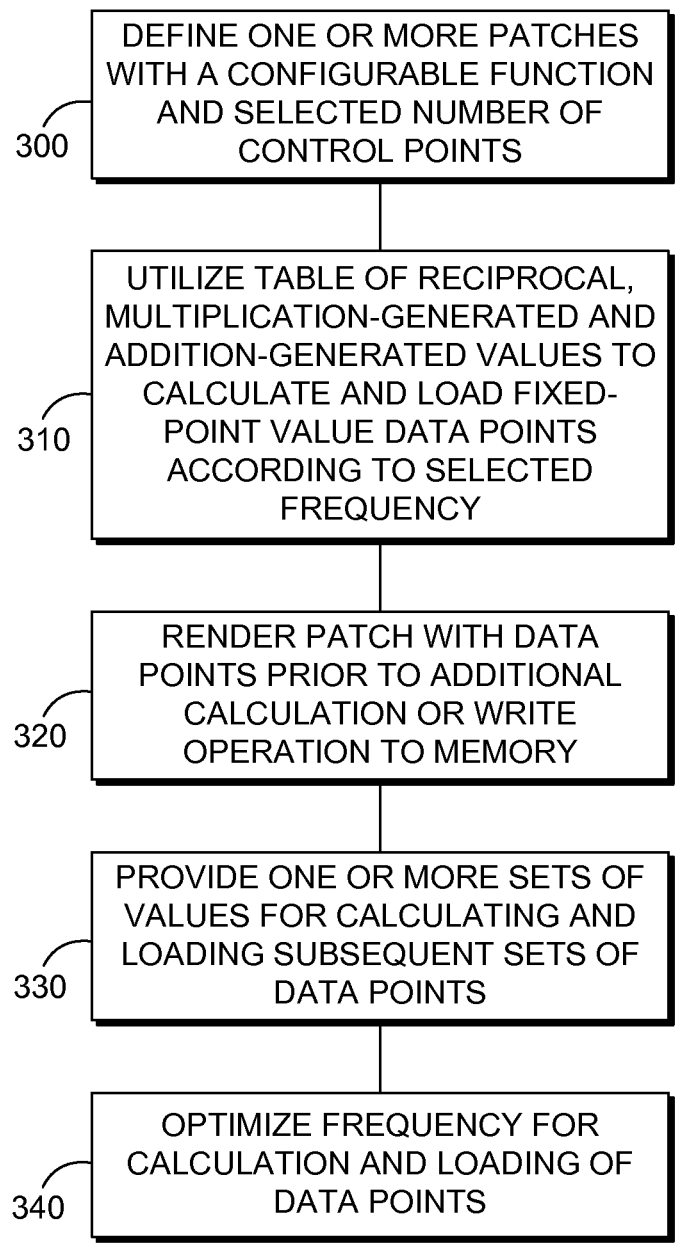
FIG. 3 is a flowchart depicting a method for the efficient loading of data points used in rendering 3D graphics.

Turning now to FIG. 3, a method is shown to more efficiently calculate and load data points. At a step 300, patches are defined with a configurable function and selected number of control points as seen above. At a step 310, a table is used to calculate data points to render the graphic. Unlike previous systems and methods, an embodiment of the present invention generates fixed-point calculations that reduce the processing required to generate the values. The approximations required by floating point operations is eliminated, thus making the operations technologically less cumbersome. In some embodiments of the present invention, division is eliminated, which also is technically more resource-intensive. By using only reciprocals, multiplication and addition, hardware needs are further reduced.

At a step 320, data points are used in the rendering of a patch. This occurs prior to the use of any other calculations or memory-writing operations, thus providing another improvement over the prior art. Rather than performing a set of calculations, writing to memory, and performing subsequent operations, the data points generated using the present invention can be used directly to render the patch. Again, this increases hardware efficiency, allowing for quicker processing. One or more sets of values derived at step 310 above are provided for calculating and loading subsequent sets of data points at a step 330. Embodiments of the present invention re-use portions of the calculations in order to generate additional data points throughout the patch. This is another efficiency-improving aspect of embodiments of the present invention. At a step 340, the frequency at which subsequent sets of data points can be calculated and loaded are optimized. Rather than allowing for processing to take place only for each vertex, primitive, or pixel, the present invention allows for the rendering to occur per patch. Rendering can occur at a lower frequency by operating on the patch as a whole. Similarly, because patches have a number of control points, computation can occur on a per-control-point basis. Again, this requires fewer resources than processing for every primitive in a patch, each vertex, or each pixel. Additionally, system-generated values may be provided to application-specific hardware components and/or processing modules to add further efficiency. Unique integer values can be assigned to control point identification values ("control point IDs") or patch identification values ("patch IDs"). When tessellation is active, already existing system-generated values may be repurposed, such as exposing a primitive ID in lieu of a current patch ID.

Another advantage of the described embodiments is the ability to selectively determine the processing required for a patch. The processing involved by identifying the independent calculations required to operate at the more efficient frequencies may be optimized. This is not required, however, as hardware scheduling may be simplified by executing at a higher, sub-optimal frequency. After an object has been processed, regardless of the frequency used to do so, a set of statistics may be generated. This set may be queried and can include the number and type of invocations required to process the object.

Figure 4A:
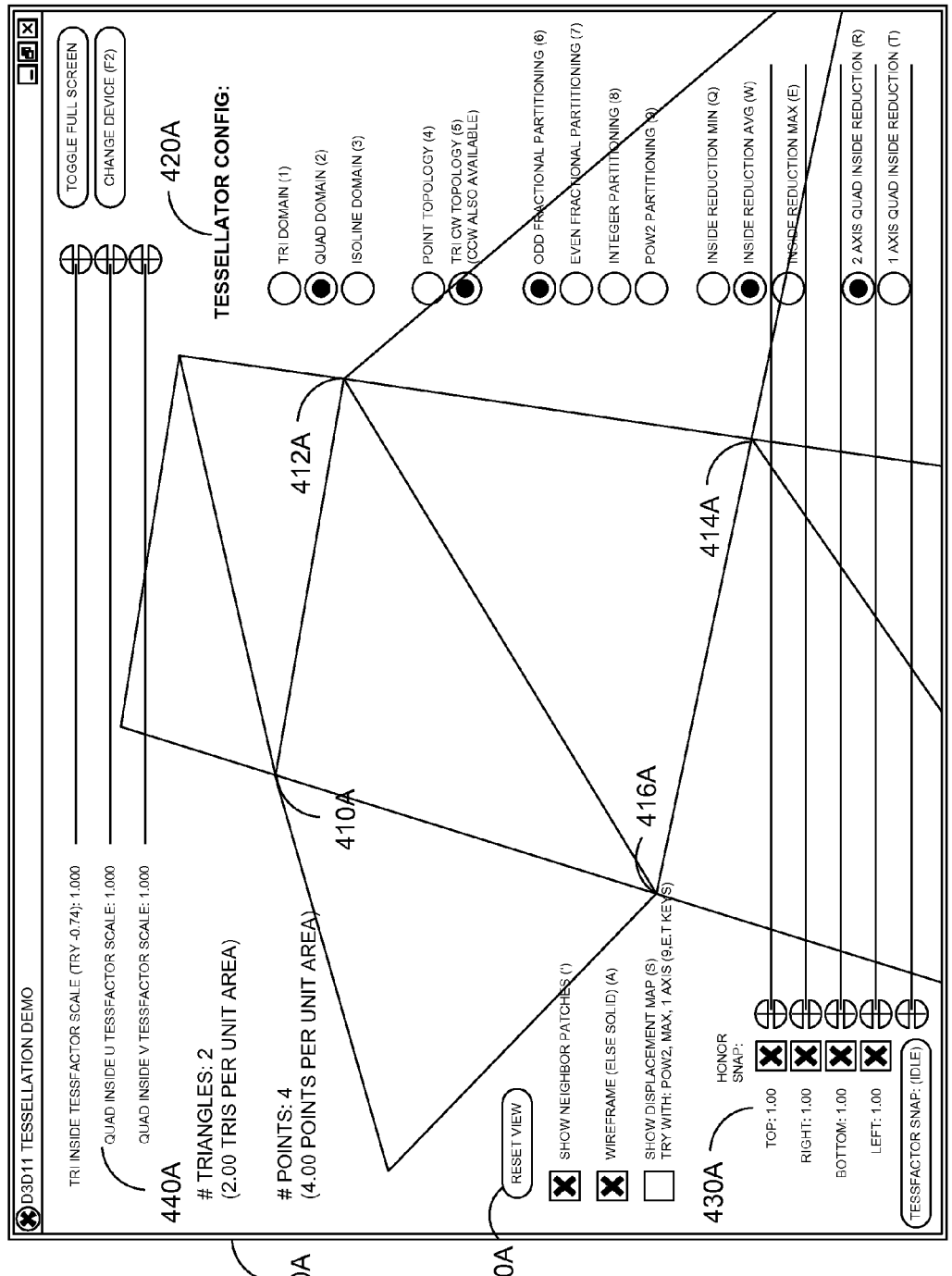
FIGS. 4A-4F are exemplary screen shots of a tessellation method in accordance with an embodiment of the present invention.

With reference now to FIG. 4A, an exemplary screenshot is depicted by a screenshot 400A. According to certain embodiments of the present invention, a patch is generated that is, as described above, a configurable function with a specified number of control points. The patch shown in FIG. 4A, not numbered, is a quad patch bounded by four controls points, 410A, 412A, 414A, and 416A. There are adjacent patches, also not numbered, that are shown to the top, bottom, left and right of the patch that is shown undergoing tessellation. As shown along the right portion of the screenshot, there are a number of tessellator configuration settings that may be selected. The first three options shown are the domain settings allowing rendering in a triangle domain, a quad domain or an isoline domain. Among configuration settings 420A, the quad domain setting of is selected. These configuration options are shown to be illustrative and are not meant to be limiting in nature.

The configuration settings shown include settings for point topology, partitioning, and inside reduction functions. The final result can be a series of triangles forming a surface, a series of line segments forming an isoline, or a series of independent points. The partitioning setting determines with what frequency segments are of uniform length when tessellating a patch. Thus, the odd-fractional partitioning setting shown among tessellator configuration settings 420A allows for uniform segment lengths when the tessellation factor is odd. The inside reduction settings of minimum, average, and maximum, determine how the interior tessellation of a patch will be reduced. There is also a setting for selecting the number of axes used in the interior reduction. In the illustrative screenshot, an average reduction is selected.

Continuing with FIG. 4A, there are a set of tessellation factors numbered 430A. The tessellation factors shown in this area of the exemplary screenshot are factors used in tessellating the edges of a patch. Therefore, because a quad patch is shown, there are four tessellation factors shown for the top, bottom, right, and left edges of the patch. Each member of set of tessellation factors 430A is set with a tessellation value of one, meaning the patch of this particular screenshot is not tessellated along its edges and shows only one primitive per edge. Closely related to set of tessellation factors 430A are a set of inside tessellation scaling factors 440A. Inside scaling factors 440A determine the density of the tessellation throughout the patch. In the example, scaling factors of a quad patch are shown for "U" and "V" directions, allowing for changing densities along a horizontal or vertical axis. Again, this is merely illustrative in nature and will vary depending on the type of patch selected for tessellation. The values selected for inside scaling factors 440A are not limited to those shown in the screenshot, but could be varied according to other means.

Also shown in FIG. 4A are a set of view options, depicted as options 450A. In the illustrative example, the view options contain a reset view button, along with options to show neighboring patches, to show only frame or full graphics, and to show displacement maps. In exemplary screenshot 400A, the neighboring patches option is selected, which results in rendering the four patches adjacent to the four edges of the currently tessellated patch. The frame option is also selected showing only the lines between pertinent control points and data points. Because the patch bounded by control points 410A, 412A, 414A and 416A has a tessellation factor of one on all edges, there are only the lines between the four points and the line connecting points 412A and 416A in order to form the two primitives of the patch. In FIG. 4A, the displacement map option is not selected, although this feature will be discussed in greater detail below.

Figure 4B:
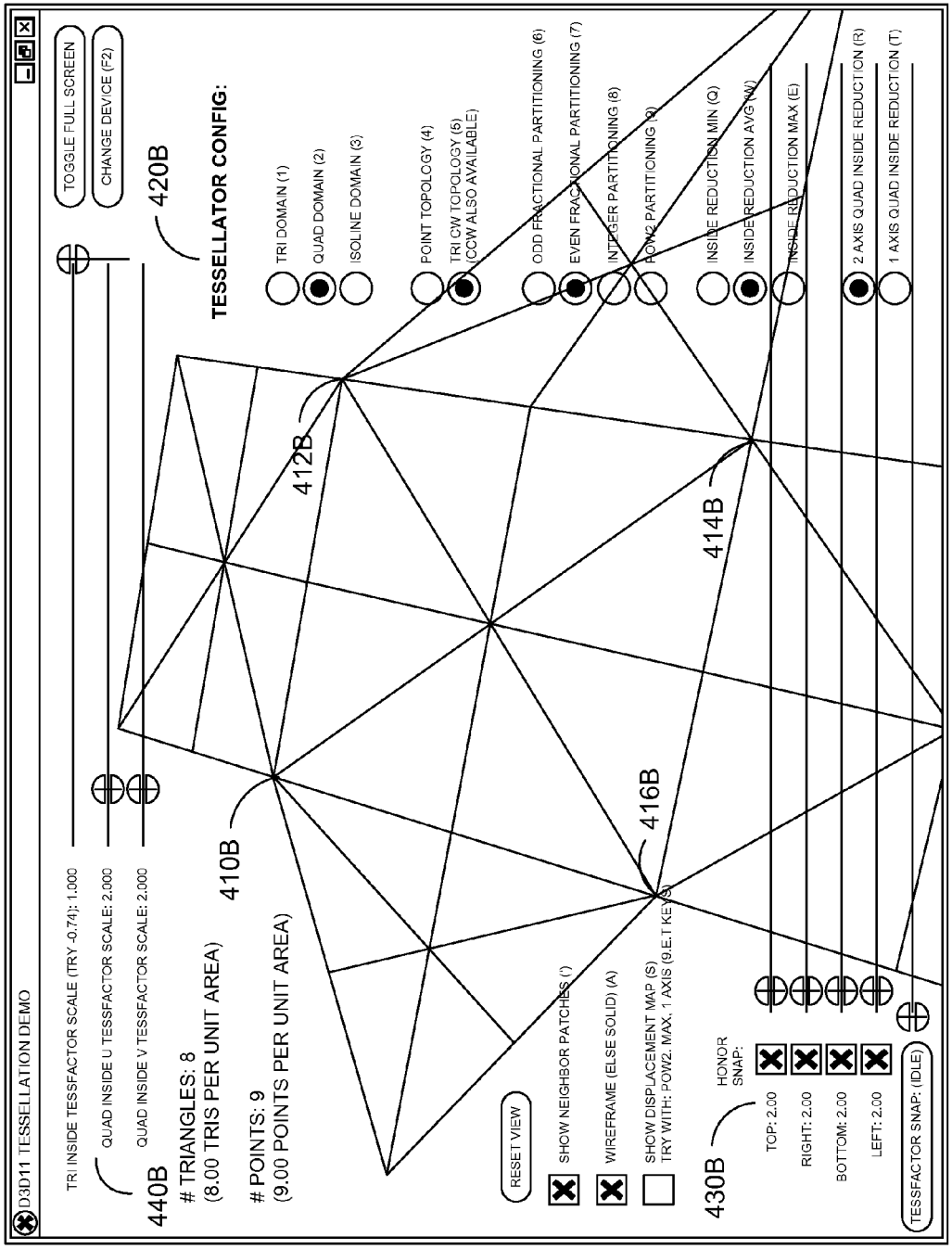

Now looking at FIG. 4B, an exemplary screenshot is shown that includes many of the same features of FIG. 4A. A set of control points 410B, 412B, 414B, and 416B bound a patch of similar size and location as the patch defined previously. However, as seen at a set of tessellator configuration values 420B, even-fractional partitioning is now a selected setting. A set of tessellation factors 430B are also changed, showing tessellation factors of two for each of the four edges of the patch. Because configuration values 420B reflect even-fractional partitioning, the patch is divided into two equal segments along each edge. Rather than the two-primitive rendering as shown in the previous figure, now eight triangles are used to divide the patch. As mentioned above, this method will create a new tessellation pattern only for values of two and higher, therefore the continuous tessellation from a factor of one is not available. Increased processing also results from this tessellation method as eight triangles must be rendered with associated data points and segments. Also selected in screenshot 400B are a set of inside tessellation factors 440B. In the illustrative screenshot, they are shown also to be two to render the interior portions of the patch as shown.

Figure 4C:
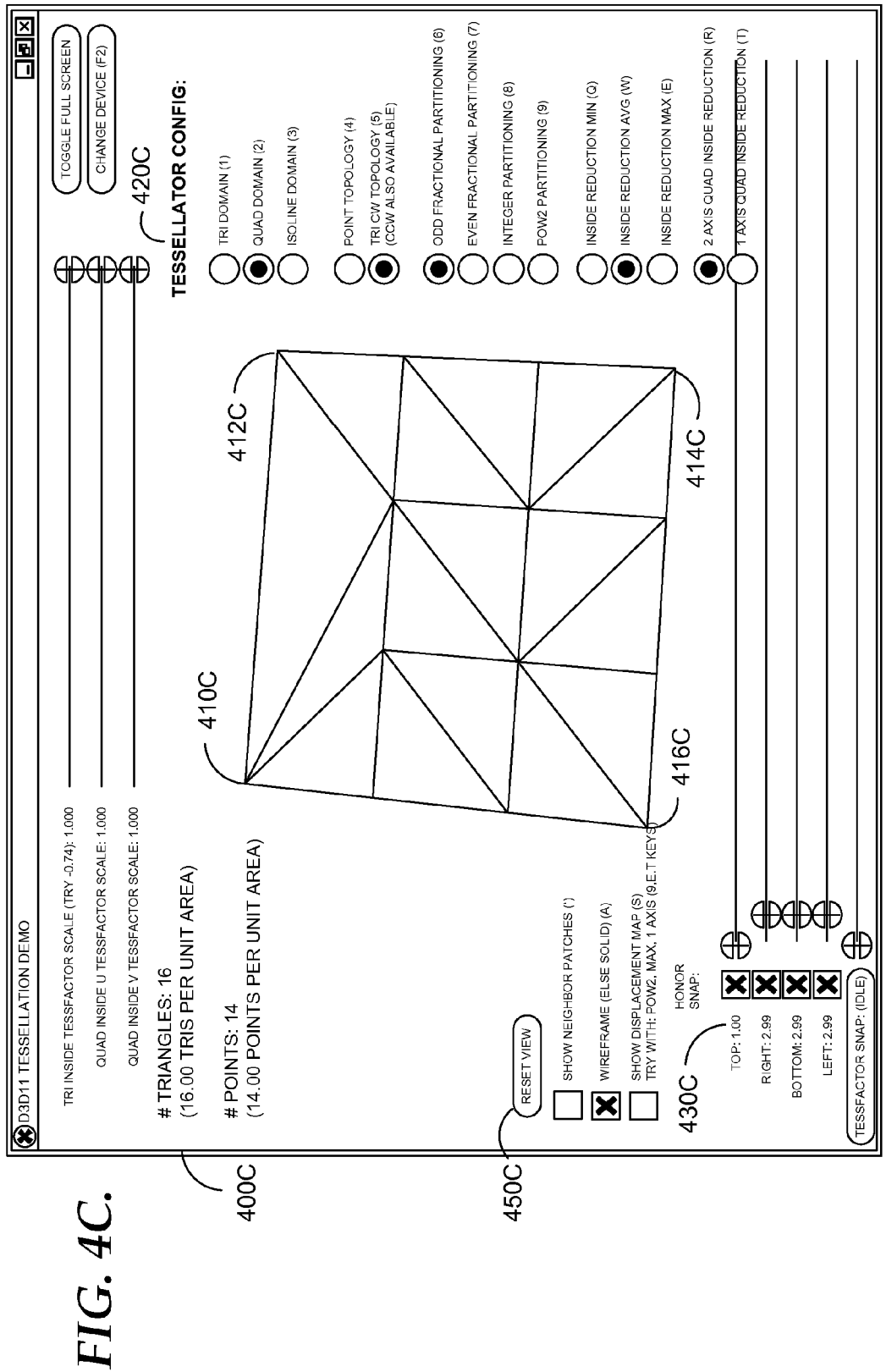

In FIG. 4C, an exemplary screenshot 400C is shown that utilizes varying tessellation factors along the edges of the patch. This figure also has a simplified display because a set of view options 450C does not have the "show neighbor patches" setting selected. Thus, only the patch that is being tessellated, bounded by control points 410C, 412C, 414C, and 416C, is shown. A set of tessellator configuration values 420C has a selection of odd-fractional partitioning as seen previously. Because a set of tessellation factors 430C are chosen with a factor of one along the top edge and very close to three along the left, right, and bottom edges, the divisions along each edge are uniform in length.

Figure 4D:
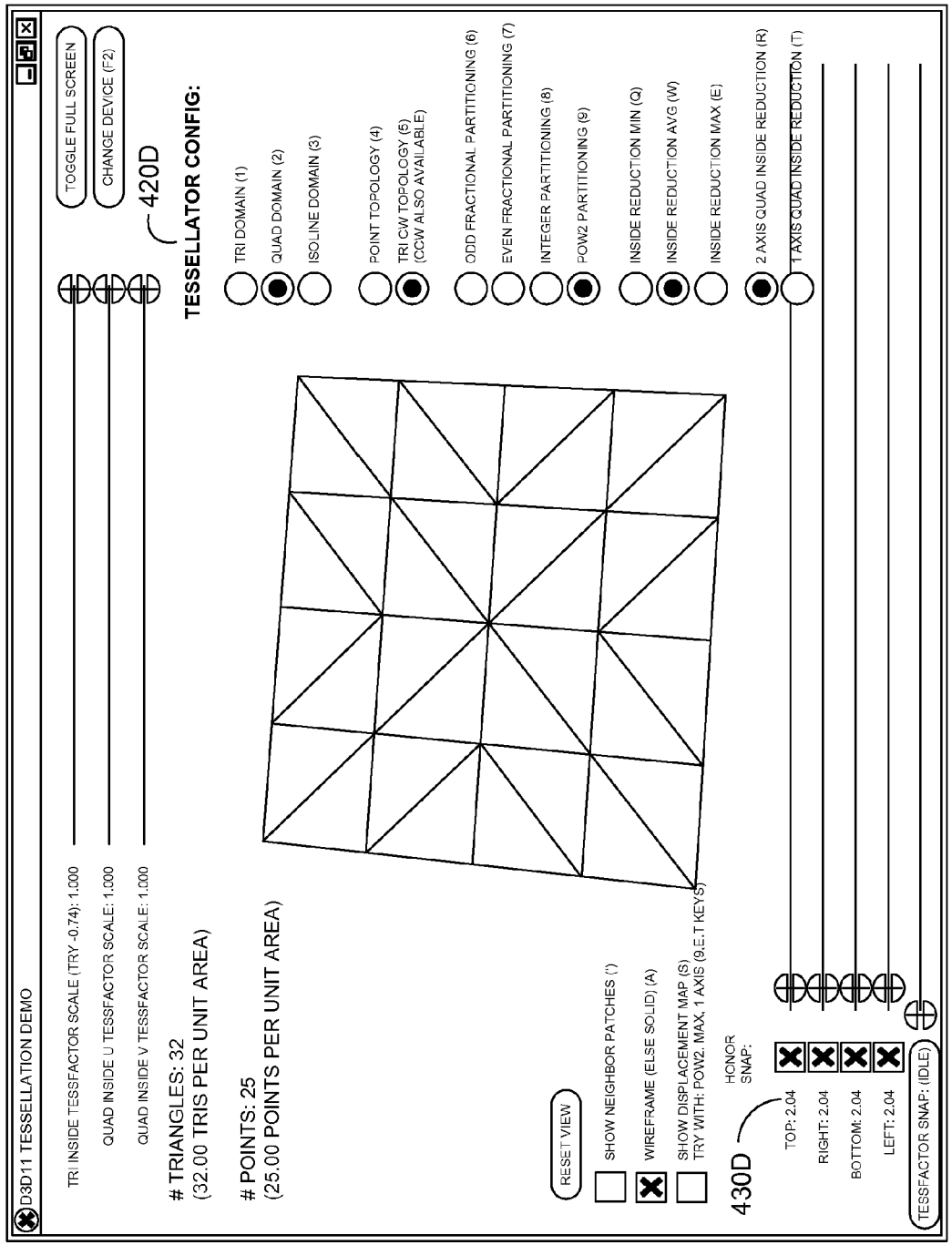
Figure 4E:
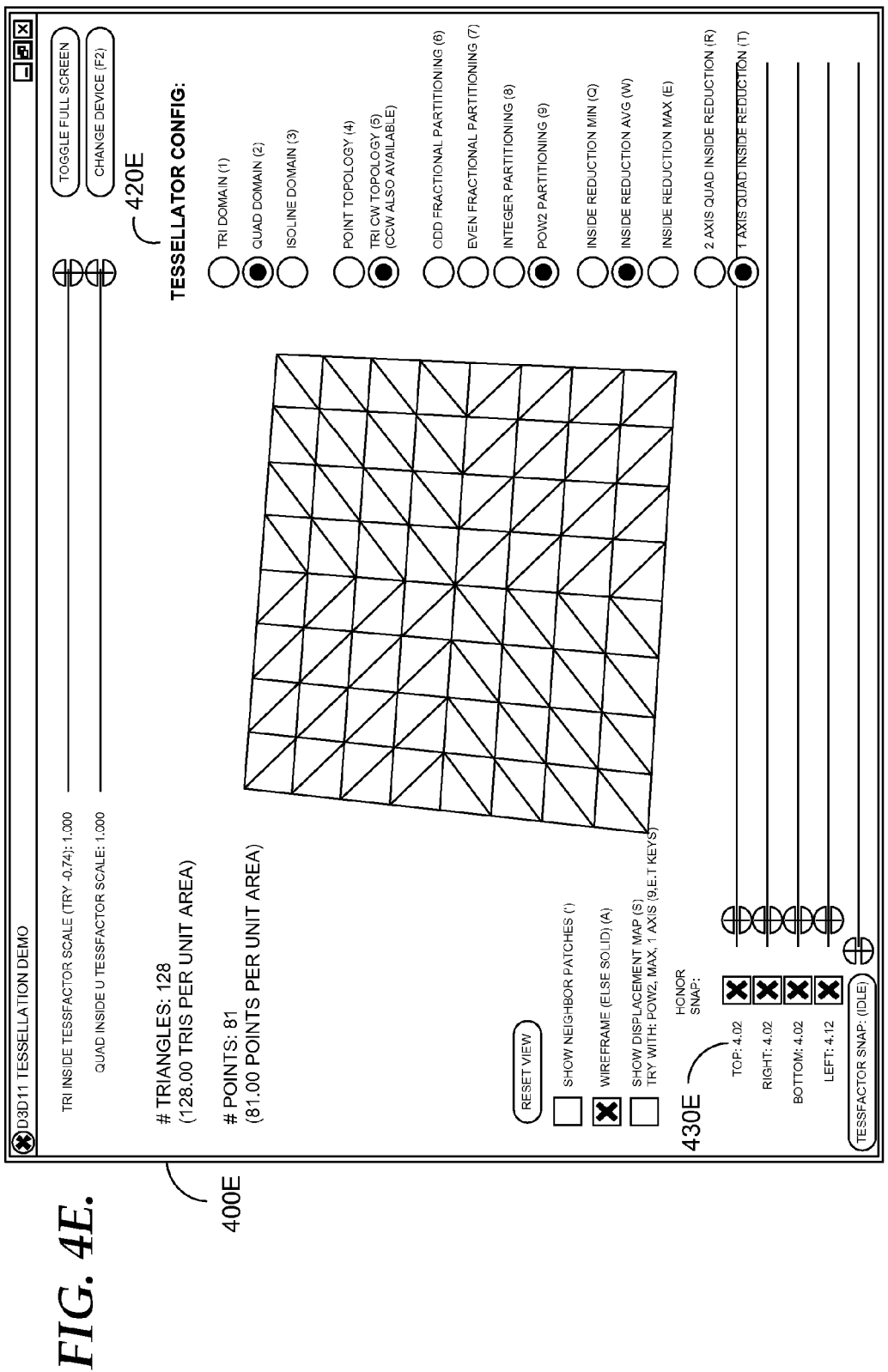
Figure 4F:
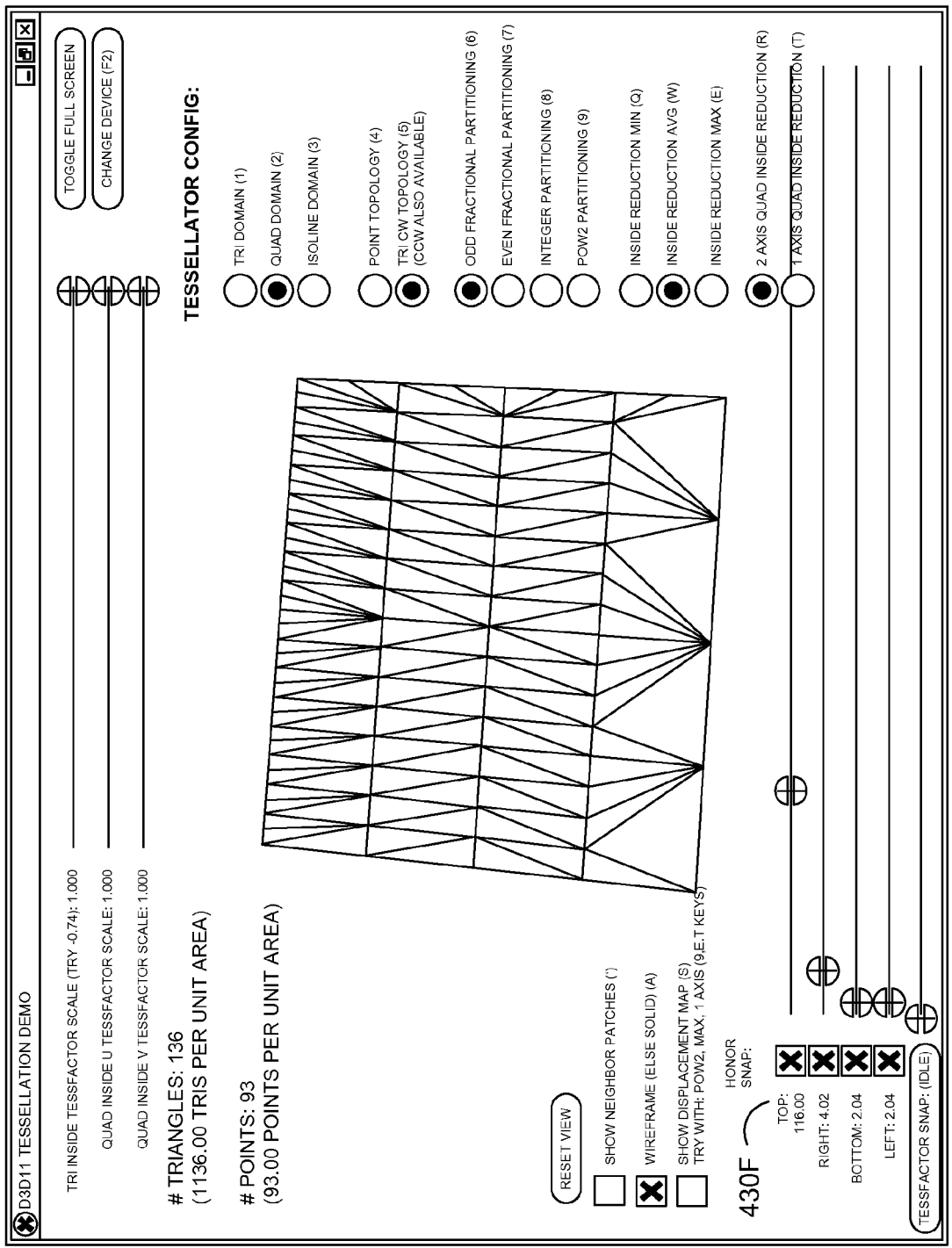

FIGS. 4D, 4E, and 4F also depict exemplary screenshots, numbered 400D, 400E, and 400F, respectively, with various settings to demonstrate the advantages of the present invention with respect to its use of power-of-two tessellation. Turning to FIG. 4D, an illustrative depiction of power-of-two tessellation is shown in exemplary screenshot 400D. A set of tessellator configuration values 420D are included that show the "POW2 Partitioning" selection. This setting ensures that tessellation will only occur at power-of-two values, such as the values of two seen at a set of tessellation factors 430D. This can be compared to FIG. 4E, depicting a similar screenshot with a set of tessellation factors 430E that are set at a factor of four. When comparing, it should be noted that every data point generated for the patch in FIG. 4D is also generated for the patch in FIG. 4E. The tessellation shown in FIG. 4F also utilizes power-of-two tessellation, only with a set of tessellation factors 430F including variable values along each edge. The primitives generated, however, are symmetric because of the power-of-two partitioning and can easily "share" data points when increasing tessellation factors along an edge.

Figure 5:
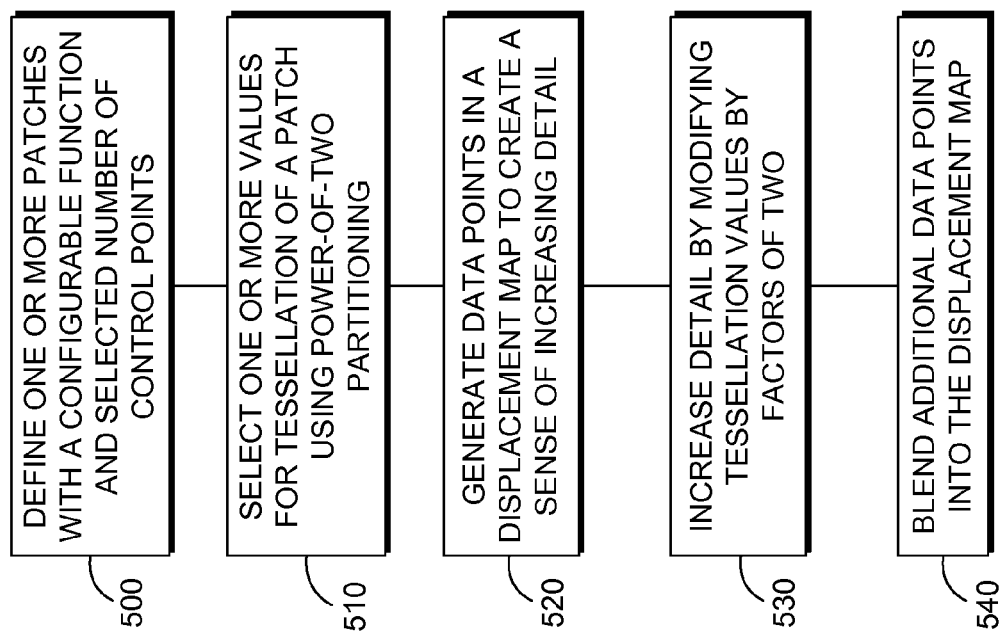
FIG. 5 is a flowchart of a method of geomorphing a surface according to an embodiment of the present invention.

Now looking at FIG. 5, a flowchart showing a method of geomorphing allows for an increase in the level of a rendered graphic without creating negative visual effects seen in previous methods. The method begins as previously seen with the definition of a patch at a step 500. At a step 510, tessellation factors are specified as previously described. The partitioning method, however, should be power-of-two tessellation as described above. At a step 520, data points are generated in a displacement map to simulate increasing detail in the patch. At a step 530, tessellation factors are increased by factors of two in order to increase detail. Once the increase in tessellation begins to occur, additional points are blended in at a step 540. Once generated, a data point will be provided in the same location for subsequent increases in tessellation. The only data points added are new points, thereby eliminating a movement of the data points that creates a false sense of fluid movement of the patch. Allowing increasing detail without this so-called "sizzling" effect allows rigid surfaces, such as terrain, to be rendered and depicted realistically. Therefore, the change in level of detail when modifying the patch also appears to occur naturally. Embodiments of the present invention also remove the need to tessellate each edge of a patch at the same tessellation factor, once again adding another aspect of novelty and flexibility for a developer.

Figure 6A:
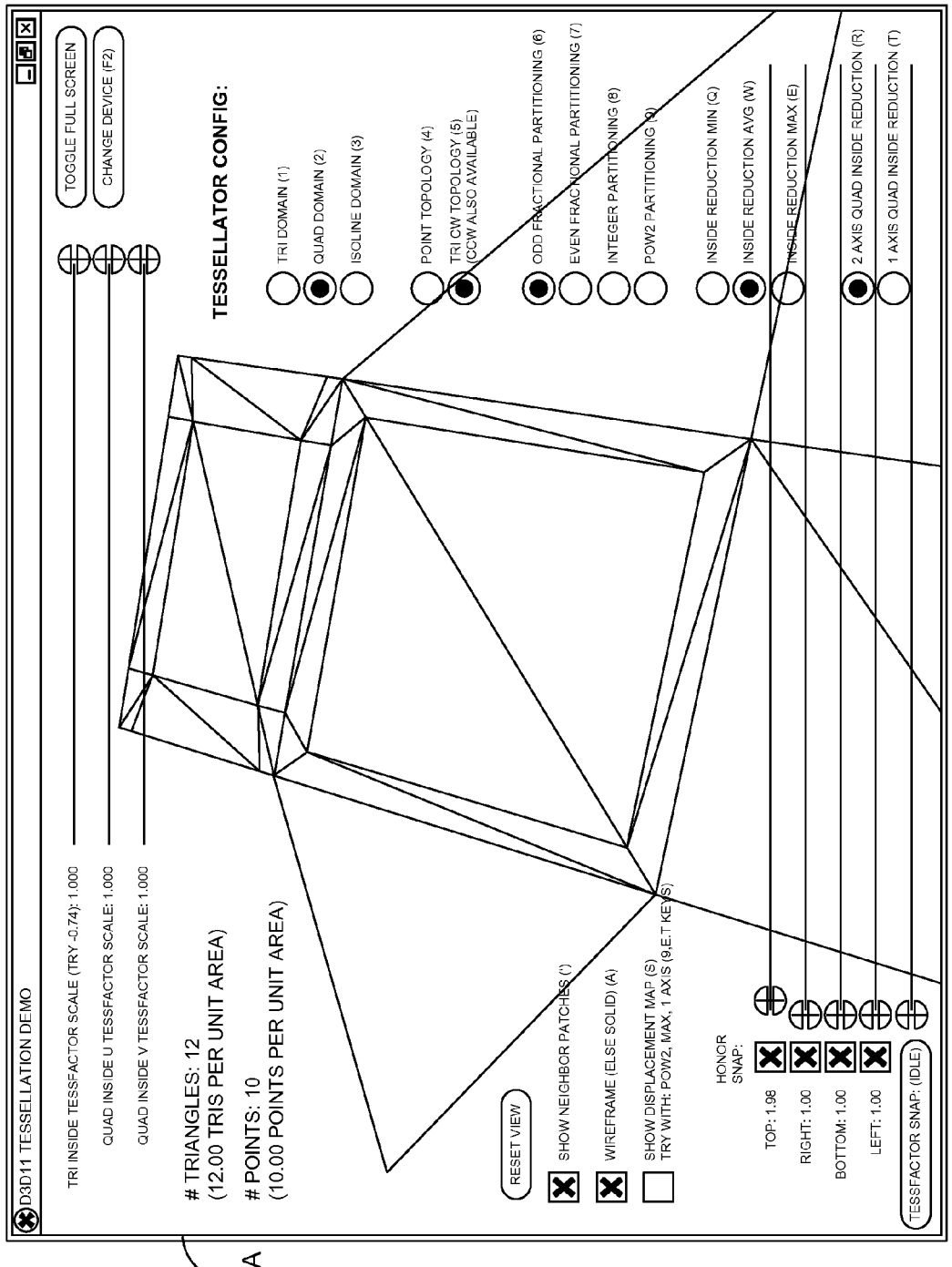
FIGS. 6A-6B are exemplary screen shots of partitioning methods available with some embodiments of the present invention.
Figure 6B:
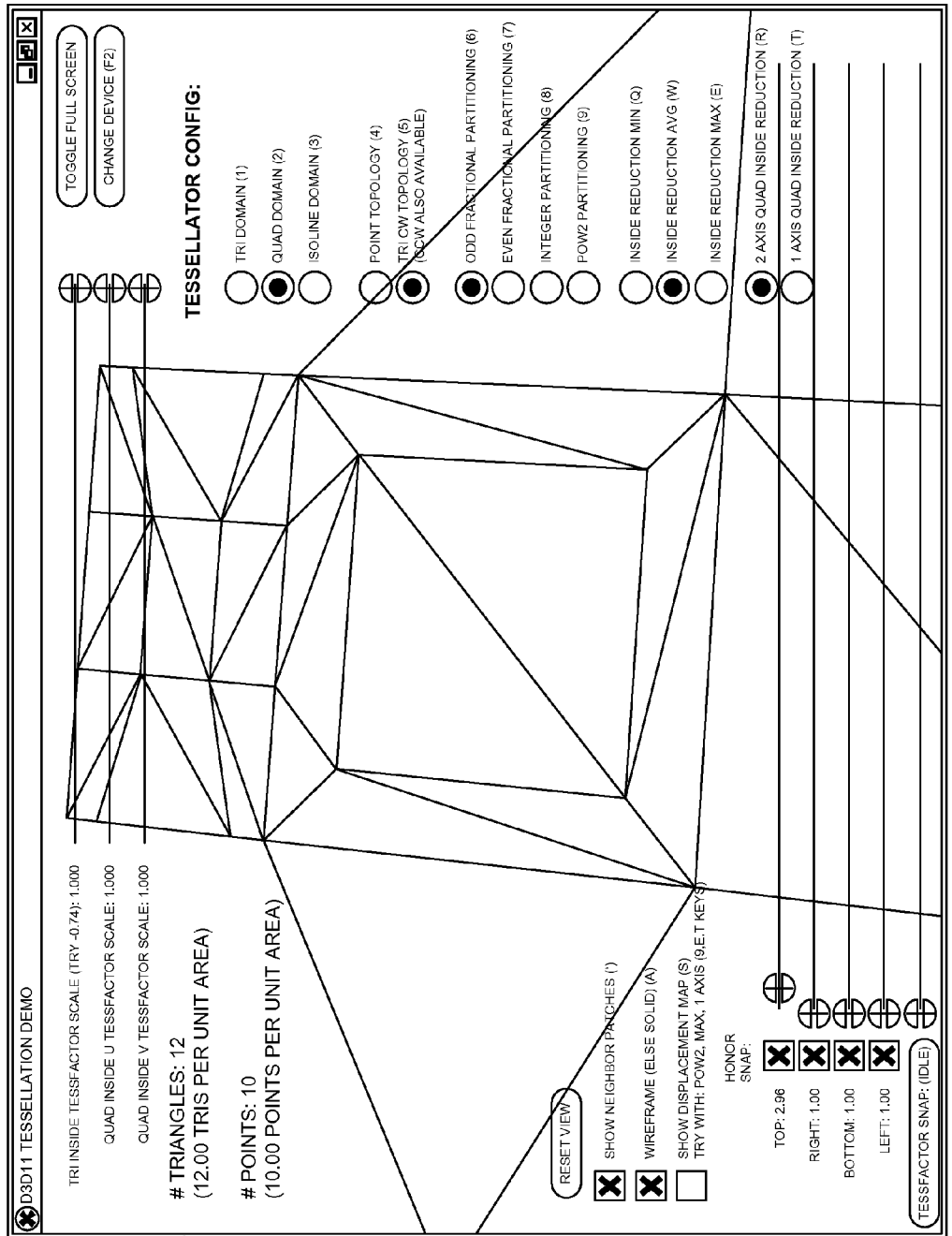

Turning to FIGS. 6A and 6B, exemplary screenshots numbered 600A and 600B, respectively, demonstrate the use of interior tessellation to eliminate the need for edges to depend on one another for their tessellation levels. As seen in screenshot 600A, an interior patch is generate creating a sense of a "frame" and an interior. This permits the top edge to be tessellated with a factor of two as seen in the figure, while the remaining edges are tessellated at a factor of one. Without the ability to create this interior-edge division, developers would be unable to render adjacent patches with varying levels of detail. Because the interior is tessellated separately, adjacent patches are able to take on any level of detail and edges may be tessellated accordingly without discontinuities between adjacent patches. Moving from FIG. 6A to FIG. 6B, the tessellation factor along the top edge is increased, changing only the size of the interior. Because the same reduction method is used, in this case an average value, only the size changes and not the geometry. Changes made to the reduction method will be seen in additional figures below.

Figure 7A:
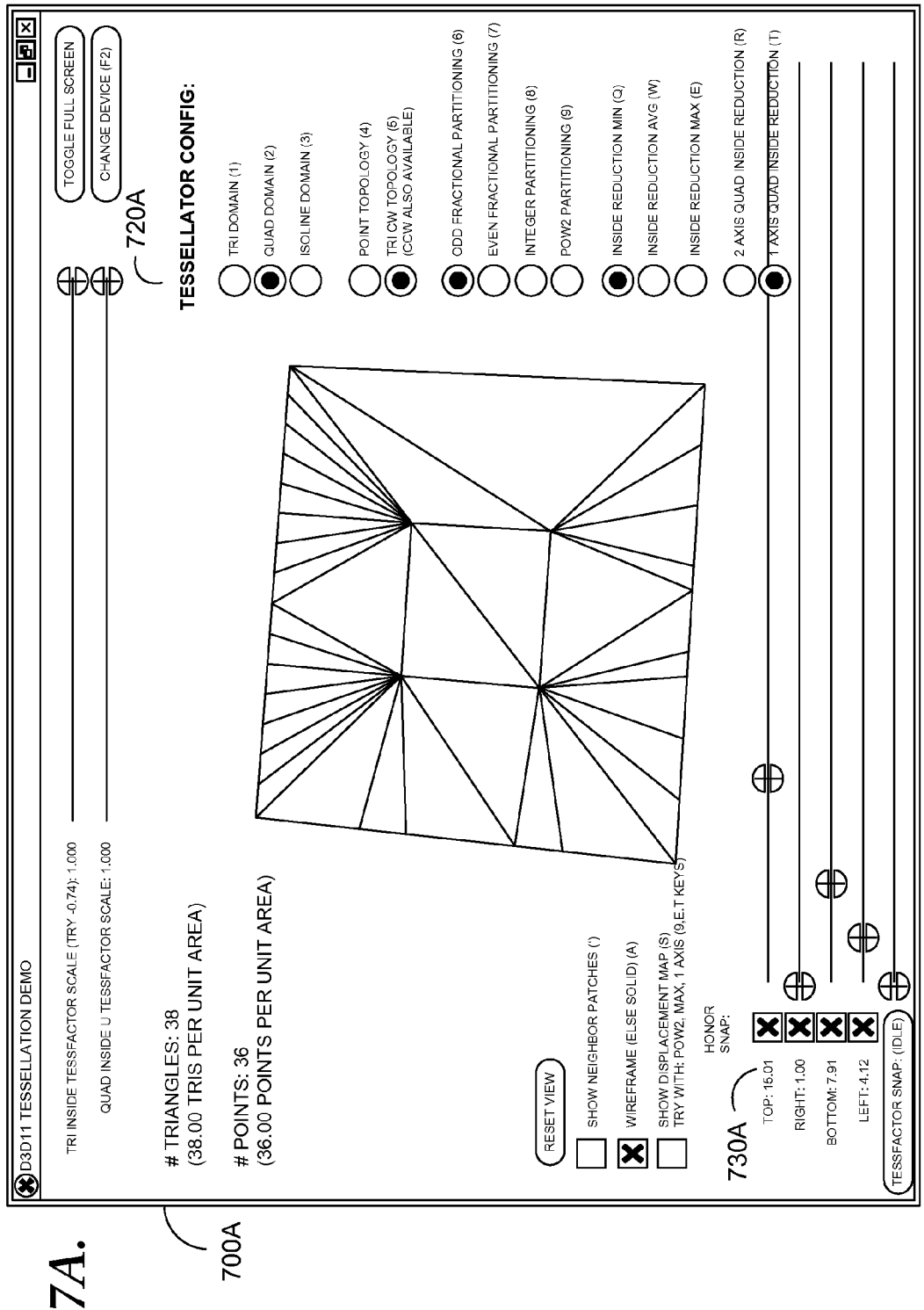
FIGS. 7A-7C are exemplary screen shots of interior reduction methods available with some embodiments of the present invention.
Figure 7B:
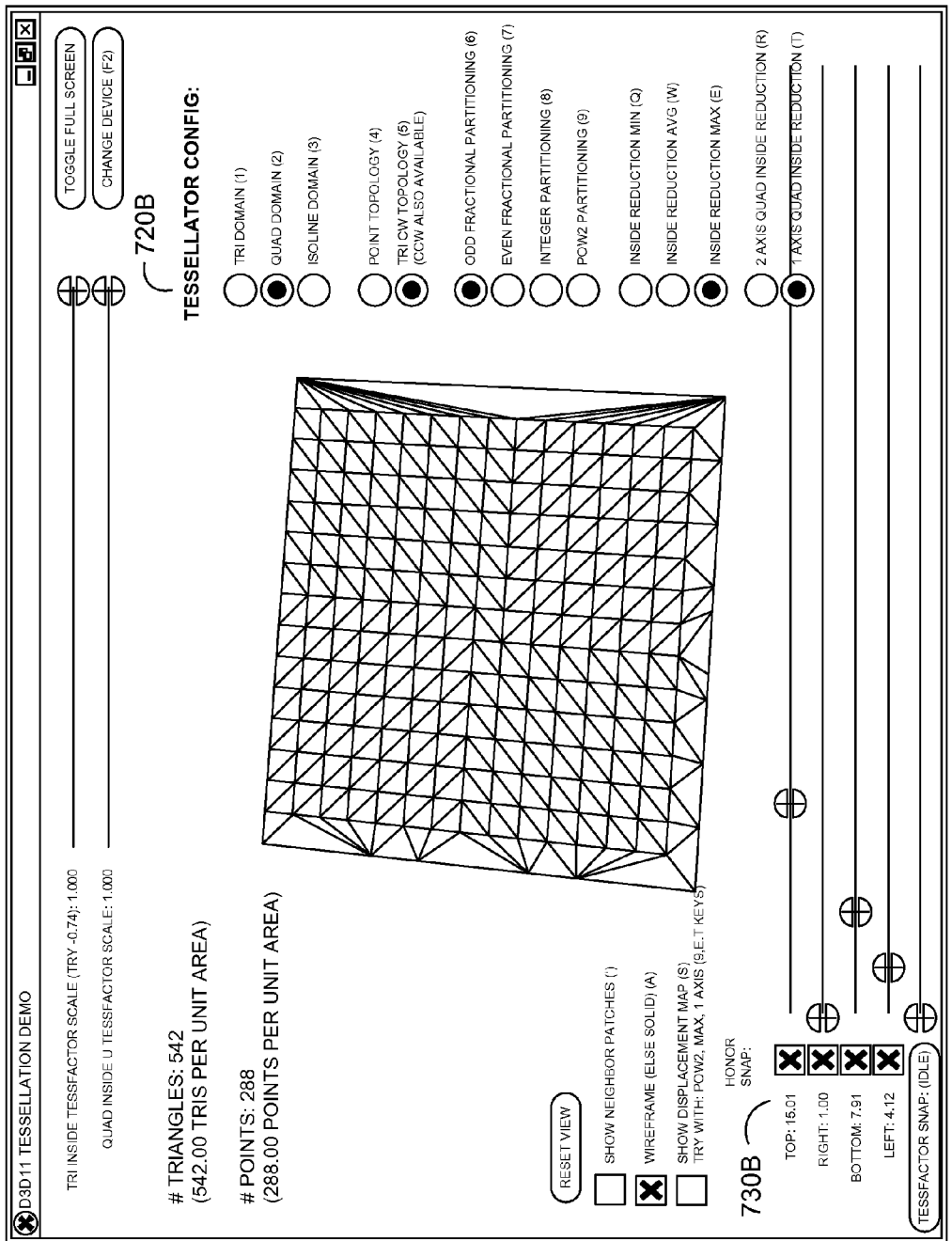
Figure 7C:
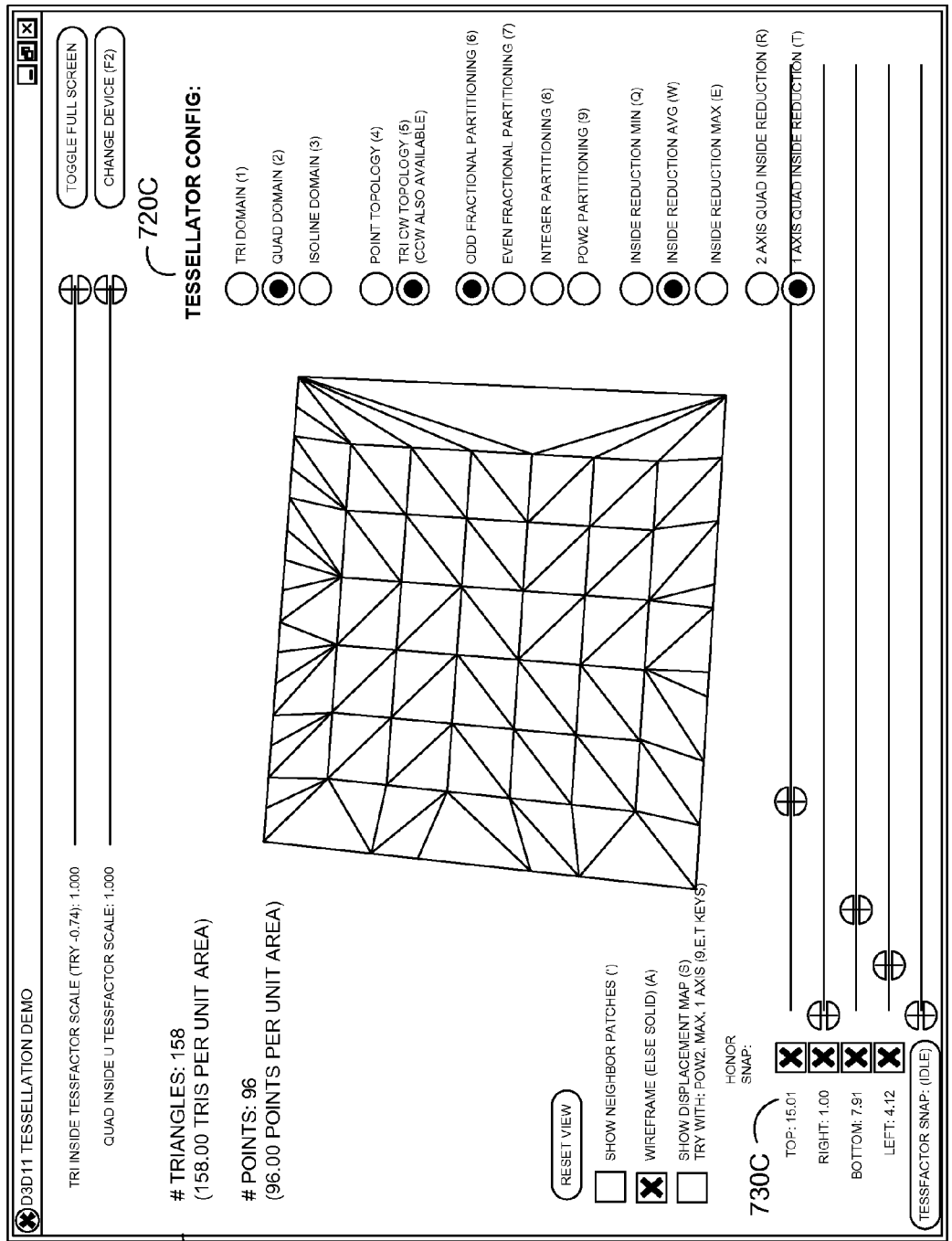

Now referring to FIGS. 7A-7C, exemplary screenshots are shown that depict advantages of the present invention with regard to interior reduction. Interior reduction refers to the method of setting an interior tessellation value in accordance with existing edge factors. An exemplary screenshot 700A shows a minimum interior reduction of a quad-domain patch as seen earlier. This is selected through the use of a set of tessellator configuration options 720A. Shown along the bottom of the screenshot, a set of tessellation factor values 730A are set with approximate values of 15, one, eight, and four, along the top, right, bottom, and left, respectively. Because the minimum interior reduction setting is selected among options 720A, the interior tessellation factor is the minimum of the four values, or one. Thus, the interior has only two primitives, or the minimum amount of triangles needed in the quad domain. This can be compared with the patch in an exemplary screenshot 700B, which shows a set of tessellator configuration options 720B including a maximum interior reduction option. Because a set of tessellator factors 730B are the same as set 720B, the interior reduction value is approximately 15. Therefore, the "frame" is only a small portion of the patch and the interior is much more robustly tessellated. Looking at an exemplary screenshot 700C, the selection of an average interior reduction among a set of tessellator configuration options 720C again changes the patch geometry. In this instance, the values of one, four, eight and 15 lead to an interior tessellation value of their average—approximately seven—and the interior is tessellated accordingly. Previous systems and methods tessellated the interior of patches in a rigid manner. This allows greater flexibility in creating realistic objects, based on the desired effect. Patches requiring a great degree of interior tessellation can be rendered, but those not needing this detail need not be tessellated unnecessarily. Again, this can be lead to more efficient rendering by eliminating unnecessary calculation and rendering.

Figure 8A:
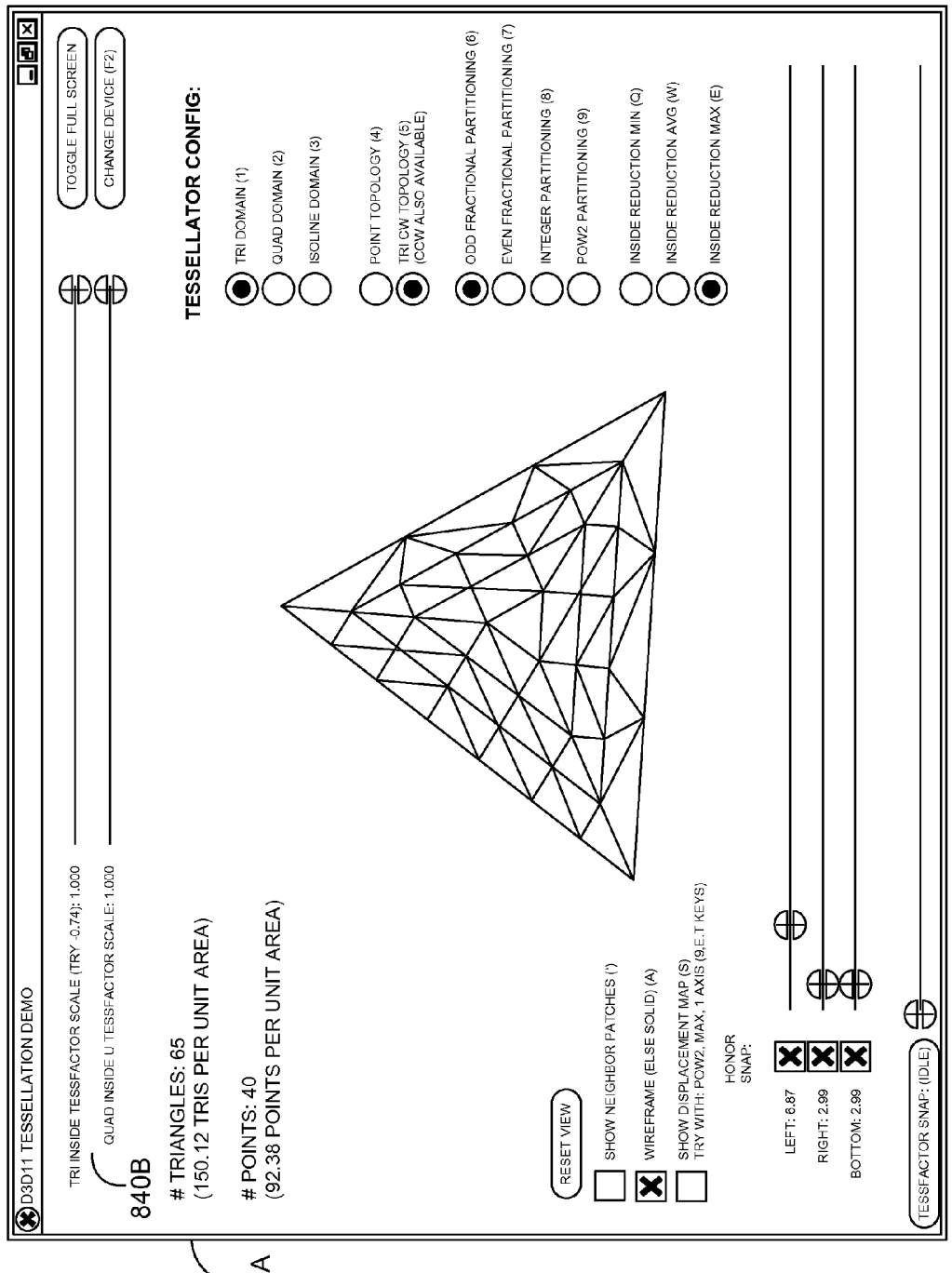
FIGS. 8A-8B are exemplary screen shots of interior scaling factors for utilization with some embodiments of the present invention.
Figure 8B:
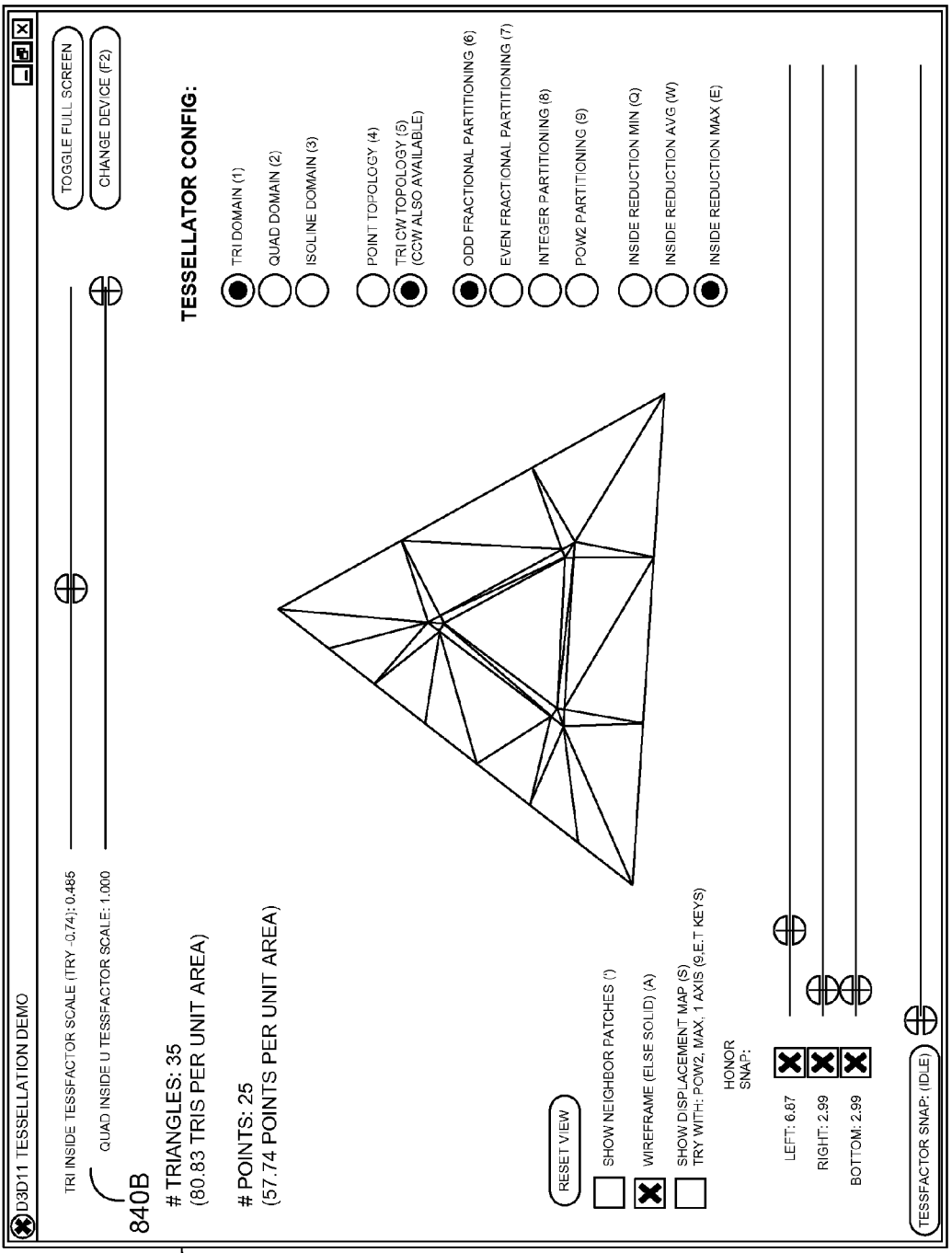

Turning to FIGS. 8A-8B, exemplary screenshots are shown that demonstrate the effects of varying the inside scaling factors as previously described. In a screenshot 800A, a triangular patch is shown with tessellation factors of 6.87, 2.99, and 2.99 along its edges. With an interior reduction selection of maximum interior reduction, the patch is tessellated at a value of 6.87 on the interior. A set of scaling factors 840A have a setting of one. This creates a number of primitives that are approximately evenly distributed throughout the interior of the patch. Turning to a screenshot 800B, a set of scaling factors 840B have been changed to show a scaling factor of 0.485. The change in scaling factor shown significantly changes the geometry of the interior, reducing the interior tessellation in size and increasing the size of the primitives closer to the edge. This permits flexibility in how patches are generated by developers to increase the realism available to end-users.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and is within the scope of the claims.

What is claimed is:

1. One or more computer storage media hardware devices having computer-useable instructions embodied thereon for performing an efficient method of calculating and loading data points for rendering three-dimensional (3D) graphics, wherein objects are rendered utilizing one or more patches made up of graphics primitives, the method comprising:
    defining the one or more patches, wherein each patch is defined by a configurable function and a number of control points;
    calculating and loading a first set of data points according to a set of parameters associated with a first patch, wherein calculating utilizes fixed-point calculations that exclude floating point calculations in order to reduce processing;
    based on the fixed-point generated first set of data points, continuously and directly rendering the first patch prior to additional calculations or write operations to memory of the first set of data points, wherein the additional calculations or write operations to memory render the first patch at an alternate time; and
    calculating and loading a second set of data points associated with the first patch, wherein calculating utilizes the fixed-point calculations that exclude floating point calculations while reusing one or more intermediate results from one or more values from the calculated first set of data points of the first patch, wherein the first and second sets of data points are used to continuously render the three-dimensional graphics, and wherein the fixed-point calculations and reusing intermediate results calculates and loads at least the first sets of data points using an optimized frequency, the fixed point calculations comprising reciprocals, multiplication, and addition operations while explicitly excluding division operations.

2. The media of claim 1, wherein the set of parameters include one or more frequencies associated with the patch selected from the group comprising: per-vertex frequency, per-primitive frequency, per pixel frequency, per-control-point frequency, and per-patch frequency, wherein the one or more frequencies are selectively identified for rendering based in part on optimizing rendering at different frequencies.

3. The media of claim 2, wherein each parameter in the set of parameters is given a unique integer identifier.

4. The media of claim 1, further comprising:
    generating a set of data associated with a total quantity of operations necessary for calculating and loading the first set of data points; and
    performing a query of the set of data.

5. A method of calculating and loading data points for rendering three-dimensional (3D) graphics, wherein objects are rendered utilizing one or more patches made up of graphics primitives, the method comprising:
    defining the one or more patches, wherein each patch is defined by a configurable function and a number of control points;
    calculating and loading a first set of data points according to a set of parameters associated with a first patch, wherein calculating utilizes fixed-point calculations that exclude floating point calculations in order to reduce processing;
    based on the fixed-point generated first set of data points, continuously and directly rendering the first patch prior to additional calculations or write operations to memory of the first set of data points, wherein the additional calculations or write operations to memory render the first patch at an alternate time; and
    calculating and loading a second set of data points associated with the first patch, wherein calculating utilizes the fixed-point calculations that exclude floating point calculations while reusing one or more intermediate results from one or more values from the calculated first set of data points of the first patch, wherein the first and second sets of data points are used to continuously render the three-dimensional graphics, and wherein the fixed-point calculations and reusing intermediate results calculates and loads at least the first sets of data points using an optimized frequency, the fixed point calculations comprising reciprocals, multiplication, and addition operations while explicitly excluding division operations.

6. The method of claim 5, wherein the set of parameters include one or more frequencies associated with the patch selected from the group comprising:
    per-vertex frequency, per-primitive frequency, per pixel frequency, per-control-point frequency, and per-patch frequency, wherein the one or more frequencies are selectively identified for rendering based in part on optimizing rendering at different frequencies.

7. The method of claim 6, wherein each parameter in the set of parameters is given a unique integer identifier.

8. The method of claim 5, further comprising:
    generating a set of data associated with a total quantity of operations necessary for calculating and loading the first set of data points; and
    performing a query of the set of data.

9. A computing device having stored thereon computer-useable instructions that, when executed, cause the computing device to perform a method of calculating and loading data points for rendering three-dimensional (3D) graphics, wherein objects are rendered utilizing one or more patches made up of graphics primitives, the method comprising:
    defining the one or more patches, wherein each patch is defined by a configurable function and a number of control points;
    calculating and loading a first set of data points according to a set of parameters associated with a first patch, wherein calculating utilizes fixed-point calculations that exclude floating point calculations in order to reduce processing,
    based on the fixed-point generated first set of data points, continuously and directly rendering the first patch prior to additional calculations or write operations to memory of the first set of data points, wherein the additional calculations or write operations to memory render the first patch at an alternate time; and
    calculating and loading a second set of data points associated with the first patch, wherein calculating utilizes the fixed-point calculations that exclude floating point calculations while reusing one or more intermediate results from one or more values from the calculated first set of data points of the first patch, wherein the first and second sets of data points are used to continuously render the three-dimensional graphics, and wherein the fixed-point calculations and reusing intermediate results calculates and loads at least the first sets of data points using an optimized frequency, the fixed point calculations comprising reciprocals, multiplication, and addition operations while explicitly excluding division operations.

10. The computing device of claim 9, wherein the set of parameters include one or more frequencies associated with the patch selected from the group comprising: per-vertex frequency, per-primitive frequency, per pixel frequency, percontrol-point frequency, and per-patch frequency, wherein the one or more frequencies are selectively identified for rendering based in part on optimizing rendering at different frequencies.

11. The computing device of claim 10, wherein each parameter in the set of parameters is given a unique integer identifier.

12. The computing device of claim 9, further comprising:
generating a set of data associated with a total quantity of operations necessary for calculating and loading the first set of data points; and
performing a query of the set of data.

* * * * *